United States Patent
Coyle

[15] 3,699,175
[45] Oct. 17, 1972

[54] HYDROXYLATION OF AROMATICS
[72] Inventor: James Coyle, El Cerrito, Calif.
[73] Assignee: Shell Oil Company, New York, N.Y.
[22] Filed: Jan. 9, 1970
[21] Appl. No.: 1,846

[52] U.S. Cl..........260/621 G, 260/619 R, 260/619 F, 260/620, 260/624 R
[51] Int. Cl...............................................C07c 37/00
[58] Field of Search.................................260/621 G

[56] References Cited
UNITED STATES PATENTS

| | | | |
|---|---|---|---|
| 3,441,617 | 4/1969 | Lloyd | 260/621 G |
| 3,408,409 | 10/1968 | Coffey et al. | 260/621 G |
| 3,415,885 | 12/1968 | Hooper | 260/621 G X |
| 3,422,147 | 1/1969 | Fenton | 260/621 G X |

*Primary Examiner*—Leon Zitver
*Assistant Examiner*—Norman Morgenstern
*Attorney*—John H. Colvin and Henry C. Geller

[57] ABSTRACT

Aromatic hydroxyl compounds are produced by the direct transfer of oxygen from a metal ion-enediol-oxygen complex to aromatic hydrocarbons in the presence of metal ion chelating agents in a solvent under controlled conditions of hydrogen ion concentration.

2 Claims, No Drawings

HYDROXYLATION OF AROMATICS

BACKGROUND OF THE INVENTION

This invention relates to a novel process for the hydroxylation of aromatic compounds. More particularly, the invention is concerned with a process whereby one hydroxyl group is attached to an aromatic nucleus. Specifically, a method is described whereby benzene is hydroxylated to phenol.

Hydroxylated aromatic compounds enjoy widespread use in the chemical industry. Phenol and cresols are used in phenolic resins, as disinfectants, flotation agents, surfactants, scouring compounds, lube oil additives, photographic developers, intermediates in ink, paint and varnish removers, and in many other ways.

Far and away, however, phenol is the most important of the hydroxylated aromatics, and its principal method of preparation, at least at the present time, is by the acid-induced rearrangement of cumene hydroperoxide, with concomitant production of acetone. While this process enjoys important technological and economic advantages, it is not without its drawbacks. A major difficulty is that this process is so closely tied to the coproduction of another large-volume industrial chemical — acetone. Approximately six-tenths of a pound of acetone is produced for every pound of phenol, and disposal of the ketone in the marketplace in the face if increasingly greater requirements for phenol may prove difficult in the future. In operation of the process, cumene hydroperoxide is produced by the liquid phase oxidation of cumene. Since the hydroperoxide is exceedingly prone to unexpected, rapid, and even violent decompositions, extreme care must be exercised in its preparation and processing. Because the rearrangement of the hydroperoxide is carried out in an acidic media, suitable and costly materials of construction must be employed.

In view of these difficulties, a process that effects the conversion of benzene to phenol by direct aerial oxidation or hydroxylation could provide a coproduct independent route and favorable economics.

The hydroxylation of benzenoid-type compounds may be brought about by Fenton's reagent, a mixture of ferrous ion and hydrogen peroxide. The main products from the oxidation of benzene by Fenton's reagent are phenol and biphenyl, their relative proportions varying with the conditions of the reaction, such as the hydrogen peroxide addition rate and the mole ratio of ferrous ion to hydrogen peroxide in the feed. The proportion of biphenyl produced under these conditions has been shown (Smith et al, J. Chem. Soc. 2,897 (1963)) to vary between 9 and 39 percent. However, the combined yields of phenol and biphenyl based on hydrogen peroxide converted are, in all cases, low, i.e., less than 5 percent.

Udenfriend et al (J. Biol. Chem. *208*, 731 (1954)) described a reaction system composed of ascorbic acid, ferrous or ferric ions, and oxygen or hydrogen peroxide which brought about the hydroxylation of aromatic compounds. Quinoline, tyramine, and acetanilide were converted to their corresponding hydroxylated derivatives in low yield, generally less than 5 percent based on ascorbic acid. More recently, other investigators (Hamilton et al J. Am. Chem. Soc. *85*, 1008 (1963)) have shown that the ascorbic acid system is capable of converting hydrocarbons to alcohols and ketones and olefins to epoxides, but again in very low efficiency.

SUMMARY OF THE INVENTION

It has now been found that aromatic hydroxyl compounds may be produced with high efficiency when direct transfer of oxygen is effected from a metal ion-enediol-oxygen complex to aromatic hydrocarbons in the presence of metal ion chelating agents in specially selected solvents under controlled conditions of hydrogen ion concentration. The overall reaction by which the hydroxylation is brought about is shown in equation (1)

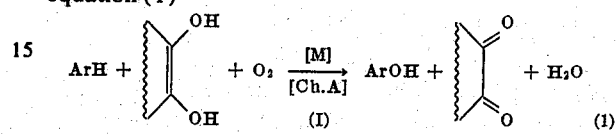

where ArH is an aromatic compound, ArOH is the corresponding nuclear-substituted hydroxyl aromatic compound, structure (I) represents an enediol, M is a metal ion, and Ch.A represents a chelating agent.

THEORY OF THE INVENTION

A proposed mechanism, which appears most consistent with the experimental data in explaining the ability of an enediol, in combination with a metal ion, to hydroxylate an aromatic compound, involves direct transfer of oxygen to the hydrocarbon. For the iron - ascorbic acid system, the mechanism would proceed as shown in Table 1.

TABLE 1

Hydroxylation of Aromatics by the Metal-Enediol System

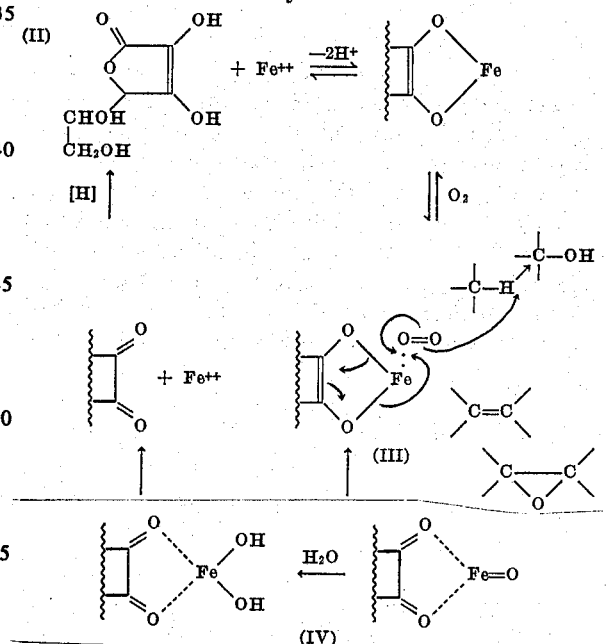

The enediol structure, $Fe^{++}$, and $O_2$ are believed to be in equilibrium with a complex such as III, the actual oxidizing agent. By a shift of electrons, an oxygen atom with six electrons is transferred from II to an organic substrate at the same time the enediol complexs is oxidized to the dicarbonyl complex IV. It is not proposed that complexs II generates a free oxygen atom but rather reacts as an "oxenoid" species, in analogy to carbenoid reactions which only formally represent transfers of true divalent carbon intermediates. The function of the ferrous ion is to form an electronic link between the enediol and oxygen, but its oxidation state remains unchanged and the reaction is thus catalytic in metal ion. The oxygenation may be made cyclic overall by chemical reduction of product dehydroascorbic acid; such enediol regenerations are known as well in enzymatic systems.

DESCRIPTION OF THE PREFERRED EMBODIMENTS

The Aromatic Substrate

Various aromatic substrates may be converted with high efficiency to their corresponding hydroxyl derivatives by the process of the invention. The aromatic hydrocarbon may be mono- or poly-cyclic, substituted or unsubstituted, e.g., benzene, toluene, the xylenes, ethylbenzene, butylbenzenes, mesitylene, durene, diphenyl, terphenyl, naphthalene, the methyl naphthalenes, phenanthrene and anthracene. The process of the invention is particularly applicable to the oxidation of benzene to phenol and of toluene to the cresols.

The Enediol

For the purpose of this invention, an enediol is defined as an organic compound in which two adjacent carbons are joined by a double, or olefinic bond, and attached to each of said carbon atoms is an OH, or hydroxyl group, as shown in structure (I). The fourth valence of each of said carbon atoms is satisfied by the formation of bonds with alkyl, aryl, carbonyl, carboxyl, other organic groupings or an hydrogen atom. Said carbon atoms may constitute a portion of a cyclic hydrocarbon structure, or they may be part of a heterocyclic ring. Suitable compounds include materials such as ascorbic acid (II), dihydroxymaleic acid (V), and enol tautomers of α-hydroxyaldehydes and ketones such as 1,3-dihydroxy propanone (VI), benzoin (VII), α-hydroxyacetophenone (VIII), and α-hydroxycyclohexanone (IX). The preferred enediols are ascorbic acid and dihydroxymaleic acid.

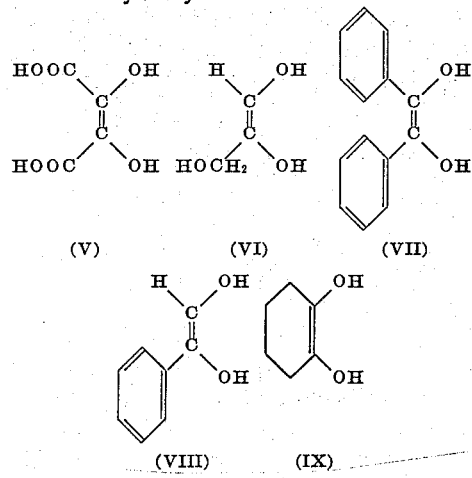

The Metal Ion

A variety of metal ions have been found to be effective in catalyzing the reaction. The better ones appear to be those which are to be found among the so-called "transition metals," which are capable of more than one oxidation state, although univalent metal ions may also be employed. Suitable metals include iron, cobalt, nickel, manganese, uranium, magnesium, lithium, titanium, and copper. The metal ion may be added to the reaction mixture as the salt of an inorganic acid, such as sulfuric, sulfurous, hydrofluoric, hydrochloric, hydrobromic, hydriodic, nitric, nitrous, phosphoric, or phosphorous acids. Alternatively, the metal salt may be introduced as the metal salt of an organic acid, such as the $C_1$ to $C_{24}$ acyclic carboxylic acids, benzoic, toluic, halo- and nitro-benzoic, salicylic, phthalic, naphthoic, acetoacetic, iso- and tere-phthalic, hemimellitic, trimellitic, trimesic, or prehnitic acids

The Chelating Agent

Large enhancements in the rate of reaction, as well as considerable improvements in the yield of phenolic product, are effected in the presence of amino polycarboxylic acids, or chelating agents. Those which have been found to be most effective include nitrilotriacetic acid (X), N-(2-hydroxyethyl)ethylene-diaminetriacetic acid (XI), iminodiacetic acid (XII), and trans-1,2-cyclohexane-diamine tetra-acetic acid (XIII).

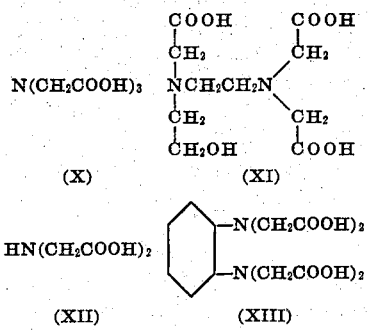

The Solvent

In practice, it is extremely desirable to carry out the hydroxylation in a solvent, and a wide variety of materials, with equally wide variation in phenol yield, may be employed for this purpose. When a solvent is employed, it is essential, if high yields of phenolic products are to be achieved, that a single phase reaction medium result. Because the reaction species (aromatic substrate and enediol), metal salts and chelating agents have varying solubility in different solvents, great care must be taken in the selection of a suitable reaction medium. Generally, mixtures of water and organic compounds have been found to be most suitable. The critical discovery of this invention resides in the use of selected classes of organic compounds which form miscible systems with water, thus permitting the reaction to proceed in a completely homogeneous fashion. Classes of organic compounds which have been found to be most suitable as the non-aqueous component of the solvent include carbonyls, alcohols, esters, acids, and nitriles, especially the latter.

Reaction Conditions

The hydroxylation reaction proceeds under a wide range of hydrogen ion concentrations, although a pH between about 3.0 and 9.0 is preferred. Particularly desirable concentrations of hydrogen ions correspond to a pH between about 4.0 and about 7.0

To maintain the pH of the reaction medium within the preferred range, a variety of common buffer solutions may be employed. While the identity of the buffer solution is not critical, aqueous solutions of sodium acetate have been found to especially useful and convenient. Other buffer systems, such as potassium hydrogen phthalate plus NaOH, potassium dihydrogen phosphate plus NaOH, tris(hydroxymethyl) aminomethane plus NaOH, borax plus HCl, aqueous potassium hydrogen tartrate, potassium dihydrogen phosphate plus disodium hydrogen phosphate, and disodium hydrogen phosphate plus citric acid, may be employed with equal facility.

The temperature at which the reaction proceeds generally lies within the range of from about 0° C. to about 150° C. The optimum temperature for a particular solvent-aromatic agent-phenolic product combination will obviously depend on solubility and volatility considerations.

Oxygen or an oxygen-containing gas, at a pressure of one to 25 atmospheres is charged to the reaction zone and distributed by spargers or similar means.

The concentration of the reactants may be varied within wide limits. Generally it has been found that the reaction proceeds in an optional fashion when the enediol concentration is within the range of 0.001 to about 2.0 molar. The lower enediol concentrations are preferred. The concentration of metal ion likewise may be widely varied e.g., from about 0.003 to about 0.4 moles per mole of enediol. A concentration approximately in the middle of this range, of from about 0.01 to about 0.06 moles of metal ion per mole of enediol, is preferred.

The process of the present invention may be effected in either a batch or continuous type operation. For example, when a batch type operation is used, a quantity of the aromatic compound is placed in an appropriate apparatus, such as, for example, a stirred autoclave, along with the enediol, the ionizable metal compound, the chelating agent, and the solvent. Oxygen is then bubbled through the mixture, and the reaction is allowed to proceed for a predetermined residence time under the hydroxylation conditions hereinbefore set forth in greater detail. The residence time may vary from about 0.5 to about 10 hours or more in duration. Upon completion of the desired residence time, the reaction is separated into product, unreacted aromatic substrate, and catalyst by conventional techniques of extraction and/or distillation.

It is also contemplated that the process of this invention may be effected in a continuous manner of operation. When such a process is used, the aromatic compound, solvent, enediol, metal catalyst, and chelating agent are continuously charged to the reaction zone, while oxygen is bubbled therethrough. A portion of the reactor contents may be continuously withdrawn therefrom, or may be permitted to reside therein for a predetermined residence time, after which it is removed. The reactor effluent is then subjected to appropriate extraction and/or distillation techniques in order to recover the desired hydroxylated aromatic compound. The process may be made cyclic overall by hydrogenating the oxidized enediol and returning it to the hydroxylation reaction.

The following examples are presented to illustrate the process of the present invention. They are, however, not intended to limit the generally broad scope of the present invention in strict accordance therewith.

EXAMPLES

General Procedure

To a 1.0 liter fluted, round-bottom glass flask, fitted with a fritted glass oxygen disperser and a mechanical stirrer, was added the aqueous solvent mixture and the enediol. After dissolution, the reaction flask was placed in a preheated (normally 50° C.) oil bath and the metal complexing agent, if any, metal salt and oxygen are introduced successively. Reaction times were as indicated, after which the reaction mixture was cooled, adjusted to pH 1-2 with hydrochloric acid, and extracted three times with approximately 150 ml portions of methylene chloride. The combined methylene chloride extracts were washed with water (2 × 100 ml), dried over sodium sulfate, and reduced to a known small volume (5-10 ml) by use of a micro-spinning band column. Products were analyzed by gas liquid partition chromatography calibrated with authentic materials.

EXAMPLE I

Hydroxylation of Toluene

To 600 ml of acetone and 630 ml of 0.058 M sodium acetate were added 945 mmoles of toluene, 22 mmoles of ascorbic acid and 0.8 mF. wt of ferrous sulphate. Oxygen, at a pressure of one atmosphere, was bubbled through the reaction medium, maintained at a temperature of 50° C, at a rate of 100 ml/min for 2 hours. By analysis of the products, the following selectivities were found: benzaldehyde, 20.4 percent, benzyl alcohol, 2.3 percent, o-cresol, 38.1 percent, m- plus p-cresol, 39.2 percent. Thus, both nuclear and side-chain oxidation took place. It may be seen that nuclear hydroxylation accounts for about 80 percent of the products. Benzaldehyde probably does not arise directly from reaction of the oxygen complex, but rather from the oxidation of benzyl alcohol under the reaction conditions.

EXAMPLE II

Effect of Chelating Agent

A. To a solvent consisting of 300 ml of acetonitrile and 315 ml of 0.058 M sodium acetate, 8.0 ml of benzene, 11.0 mmoles of dihydroxymaleic acid (the enediol) and 0.4 mF. wt. of ferrous sulphate were added. The reaction was maintained at 50° C. for 18 hours while oxygen, at a pressure of one atmosphere, was bubbled through the melange at a rate of 50 ml/hr. Based on the initial enediol present, the yield of phenol was found to be 4.4 percent. When 2.0 mmoles of nitrolotriacetic acid, a chelating agent, was added at the beginning of an identical experiment, the yield to phenol was increased to 15.0 percent.

B. When 11.0 mmoles of ascorbic acid, 500 mmoles benzene and 0.4 mF. wt of ferrous sulphate are added to a solvent consisting of 300 ml of acetonitrile and 315 ml of 0.058 M sodium acetate, and oxygen is bubbled therethrough for 2 hours at a rate of 50 ml/min, while the whole reaction medium is maintained at 50° C., a yield to phenol of 23 percent was achieved. Increased yields, on the order of 49–51 percent were achieved, when 2 mmoles of nitrilotriacetic acetic acid or N-(2-hydroxyethyl)-ethylene diaminetriacetic acid were added at the beginning of the reaction.

EXAMPLE III

Effect of Identity of the Metal Ion

Since the probable role of metal ion in the oxygen transfer reaction is to provide an electronic link for electron transfer from the eneiol dianion to an oxygen molecule, a number of metal ions were examined to ascertain their efficacy in this process. Accordingly, 0.4 mF. wt of a variety of metal salts were mixed with 11.0 mmoles of ascorbic acid, 300 ml acetonitrile, 315 ml of 0.058 M sodium acetate, and 2.0 mmoles of nitrilotriacetic acid while maintaining a temperature of 50° C., and oxygen, at a pressure of one atmosphere, was bubbled through the mixture for 18 hours, after 8 ml of benzene had been added thereto. The phenol yields, as a function of metal ion and based on initial ascorbic acid present, as shown in Table II.

TABLE II.

Phenol Yield as a Function of Metal Ion

| Run | Metal Salt | Phenol Yield, % |
|---|---|---|
| 61 | $Fe^{II}SO_4$ | 49 |
| 64 | $Fe^{II}SO_4$ | 51 |
| 103 | $Co^{III}(Acac)_3$ | 9.0 |
| 110 | $Ni^{II}(AcO)_2$ | 7.7 |
| 104 | $Mn^{II}(AcO)_2$ | 4.5 |
| 105 | $Mn^{III}(AcO)_2$ | 4.3 |
| 106 | $UO_2(AcO)_2$ | 4.0 |
| 107 | $Mg(AcO)_2$ | 5.7 |
| 111 | LiOAc | 6.6 |
| 112 | $Ti^{III}(Acac)_3$ | 4.0 |
| 49 | $Cu^{II}(NO_3)_2$ | 3.6 |

EXAMPLE IV

Effect of Solvent

That the reaction proceeds in a variety of solvents is demonstrated by a series of runs in which a solvent, maintained at 50° C., is mixed with 11.0 mmoles of ascorbic acid, 2.0 mmoles of nitrilotriacetic acid and 0.4 mF. wt of ferrous sulphate, and 50 ml of benzene, through which oxygen, at a pressure of one atmosphere, was bubbled at a rate of 50 ml/min for 18 hours. Phenol yield, based on initial ascorbic acid, is shown in Table 3.

TABLE III.

Phenol Yield as a Function of Solvent

| Run | Solvent | Phenol Yield, Based on Initial Ascorbic Acid |
|---|---|---|
| 61 | Acetonitrile (300 ml), 0.58 M $Na^+Aco^-$ (315 ml) | 49% |
| 108 | Benzonitrile (600 ml), $H_2O$ (6 ml), $Na^+$ $Aco^-$ (1.5 g) | 23% |
| 40 | Acetone (300 ml), 0.58 M $Na^+Aco^-$ (315 ml) | 11% |
| 76 | Ethyl Acetate (300 ml), 0.58 M $Na^+Aco^-$ (315 ml) | 11% |
| 72 | Acetic acid (300 ml), .058 M $Na^+Aco^-$ (315 ml) | 9% |
| 73 | Acetic acid (150 ml), .058 M $Na^+Aco^-$ (315 ml) | 7% |
| 59 | Methanol (300 ml), .058 M $N^+Aco^-$ (315 ml) | 3% |

EXAMPLE V

Solvent Optimization

In a series of experiments, the superior performance of aqueous acetonitrile solvents was examined. To 550 ml of various aqueous acetonitrile solvents, 500 mmoles of benzene, 11.0 mmoles ascorbic acid, 0.4 mmoles of ferrous sulphate, and 2 mmoles of nitrilotriacetic acid were added. Oxygen, at a pressure of one atmosphere, was bubbled through the reaction medium, at a rate of 50 ml/min, for a period of 2 hours while the temperature was maintained at 50° C. The phenol yields, as a function of volume percent acetonitrile in the aqueous solvent, are shown in Table 4.

TABLE 4.

Solvent Optimization

| Run | Volume Percent Acetonitrile | Percent Phenol Yield |
|---|---|---|
| 5A | 20 | 36 |
| 5B | 30 | 50 |
| 5C | 49 | 49 |
| 5D | 49 | 51 |
| 5E | 65 | 38 |
| 5F | 80 | 18 |

It may be seen that a mixinum in phenol yield, ca 50%, occurs in the 30—50 volume percent acetonitrile region.

EXAMPLE VI

Effect of Metal Ion Concentration

In a series of experiments designed to examine the effect of the concentration of the metal ion, an optimum was found to exist. Various amounts of ferrous sulphate were added to 315 ml of 0.058 M sodium acetate, 300 ml acetone, 11.0 mmoles benzene, and 500 mmoles maintained at 50° C. Oxygen, at a pressure of one atmosphere was bubbled through the mixture for 2 hours at a rate of 50 ml/minute. The resultant phenol yields are shown in Table 5.

TABLE 5.

Metal Ion Concentration Dependence

| Run | $Fe^{II}SO_4$, mmoles | Moles $Fe^{II}SO_4$ per mole enediol | Phenol Yield, Percent |
|---|---|---|---|
| 16 | 0.04 | 0.00364 | 2.2 |
| 190 | 0.4 | 0.0364 | 8–9 |
| 17 | 4.0 | 0.364 | 5.2 |

EXAMPLE VII pH Dependence of the Reaction

A series of experiments was undertaken to demonstrate that the hydrogen ion concentration in the reaction medium may vary within wide ranges. To 11.0 mmoles of ascorbic acid, 600 ml of 50 percent by volume aqueous acetonitrile, 0.4 mF. wt of $Fe^{II}SO_4$, 2.0 mmoles of nitrilotriacetic acid, and 90 mmoles of benzene were added. While maintaining the temperature at 50° C., oxygen at a pressure of one atmosphere was bubbled through the reaction at a rate of 50 ml/hr for 18 hours. The effect of initial pH of the reaction medium upon phenol yield is shown in Table 6.

TABLE 6.

pH Dependence of the Reaction

| Run | Initial pH | Phenol Yield, Percent, Based on Initial Ascorbic Acid |
|-----|------------|-------------------------------------------------------|
| 114 | 3.0[a]     | 19 |
| 61  | 5.3[b]     | 49 |
| 64  | 5.3[b]     | 51 |
| 117 | 9.0[c]     | 22 |

[a] Adjusted to this value with dilute hydrochloric acid.
[b] 0.058 M sodium acetate solution.
[c] Adjusted to this value with dilute sodium hydroxide.

EXAMPLE VIII

Effect of Temperature on the Reaction

Experiments carried out at 50, 75 and 100°C in a stainless steel, stirred autoclave indicate increasing yields of phenolic products with increasing temperatures. Oxygen, at a pressure of one atmosphere, was bubbled, at a rate of 50 ml/min, for 2 hours through a mixture containing 500 mmoles benzene, 315 ml of 0.058 M sodium acetate, 300 ml acetone, 11.0 mmoles ascorbic acid. The yield to phenol, based on initial ascorbic acid, were 0.3 percent at 50°C., 4.4 percent at 75°C., and 5.5 percent at 100°C.

I claim as my invention:

1. The process of oxidizing an aromatic hydrocarbon to the corresponding hydroxyl compound at a temperature between about 0°C. and about 150°C. which comprises reacting the aromatic hydrocarbon in a solvent with an oxygen-containing gas under controlled conditions of hydrogen ion concentration in the presence of a metal ion, an enediol, and a metal ion chelating agent, wherein a. the aromatic hydrocarbon is selected from the group consisting of benzene and toluene;
   b. the corresponding hydroxyl compound is phenol or a mixture of o-, m-, and p-cresols, respectively;
   c. the solvent consists of a mixture of from about 10 to about 90 percent by volume acetonitrile and from about 90 to about 10 percent by volume, respectively, water;
   d. the controlled conditions of hydrogen ion concentration correspond to a pH range of from about 3.0 to about 9.0, which pH range is maintained by the use of a buffer;
   e. the metal ion is added as a metal salt of an inorganic or organic acid in which the metal is selected from the group consisting of iron, cobalt, nickel, manganese, uranium, magnesium, lithium, titanium, and copper, and the metal ion is present in amounts of from about 0.001 to about 1.0 moles per mole of enediol;
   f. the enediol is selected from the group consisting of ascorbic acid, dihydroxymaleic acid, 1,3-dihydroxypropanone, benzoin, α-hydroxyacetophenone, and α-hydroxycyclohexanone;
   g. the metal ion chelating agent is an amino polycarboxylic acid selected from the group consisting of nitrilotriacetic acid, N-(2-hydroxyethyl) ethylenediaminetriacetic acid, iminodiacetic acid, and trans-1,2-cyclo-hexanediamine tetraacetic acid; and
   h. the components of the reaction system form a single phase.

2. The process of claim 1 wherein the buffer is aqueous sodium acetate.

* * * * *